(12) United States Patent
Ronner

(10) Patent No.: US 9,571,000 B2
(45) Date of Patent: Feb. 14, 2017

(54) METHOD FOR CONTROLLING OF A MODULAR CONVERTER

(71) Applicant: ABB Schweiz AG, Baden (CH)

(72) Inventor: Beat Ronner, Würenlos (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/851,161

(22) Filed: Sep. 11, 2015

(65) Prior Publication Data

US 2016/0079879 A1 Mar. 17, 2016

(30) Foreign Application Priority Data

Sep. 15, 2014 (EP) .................................... 14184794

(51) Int. Cl.
*H02M 5/458* (2006.01)
*B60L 9/24* (2006.01)
*H02M 7/217* (2006.01)
*H02M 1/00* (2006.01)
*H02M 3/337* (2006.01)
*H02M 7/487* (2007.01)

(52) U.S. Cl.
CPC ................. *H02M 5/458* (2013.01); *B60L 9/24* (2013.01); *H02M 7/217* (2013.01); *H02M 3/337* (2013.01); *H02M 5/4585* (2013.01); *H02M 7/487* (2013.01); *H02M 2001/0074* (2013.01)

(58) Field of Classification Search
CPC .................................................... H02M 5/458
See application file for complete search history.

(56) References Cited

U.S. PATENT DOCUMENTS

| 7,554,824 B2* | 6/2009 | Stefanutti | H02M 7/003 363/69 |
| 9,018,792 B2* | 4/2015 | Still | B60L 1/003 180/65.1 |

(Continued)

FOREIGN PATENT DOCUMENTS

| DE | 102010039699 A1 | 3/2012 |
| DE | 102010044322 A1 | 3/2012 |

(Continued)

OTHER PUBLICATIONS

Steiner, Michael, et al. "Medium frequency topology in railway applications", 2007 European Conference on Power Electronics and Applications, Jan. 1, 2007; Sep. 2, 2007-Sep. 5, 2007 IEEE, Abstract Only.

(Continued)

*Primary Examiner* — Emily P Pham
(74) *Attorney, Agent, or Firm* — Whitmyer IP Group LLC

(57) ABSTRACT

A method for controlling a modular converter, having a plurality of M converter cells, including an active AC-to-DC converter operable in one of a plurality of modes; a DC-to-DC converter; a secondary side of said AC-to-DC converter and a primary side of said DC-to-DC converter connected in parallel with a DC-link capacitor, wherein the primary sides of the converter cells are connected in series, with a first converter cell connected to a line, preferably a medium voltage line, providing an AC line voltage an M-th converter cell connected to a ground; operated by a method placing the converters in bypassed, active or diode mode.

16 Claims, 3 Drawing Sheets

(56) References Cited

U.S. PATENT DOCUMENTS

| | | | | |
|---|---|---|---|---|
| 2008/0198637 A1* | 8/2008 | Meysenc | ............... | H02M 7/219 363/67 |
| 2013/0027009 A1* | 1/2013 | Tang | ................... | H02M 3/1584 323/271 |
| 2015/0180352 A1* | 6/2015 | Mester | ..................... | B60L 9/12 363/21.03 |

FOREIGN PATENT DOCUMENTS

| | | |
|---|---|---|
| EP | 2703208 A1 | 3/2014 |
| WO | 2014037406 A1 | 3/2014 |
| WO | 2014041192 A1 | 3/2014 |

OTHER PUBLICATIONS

Claessens, Max, et al. "Traction transformation, A power-electronic traction transformer (PETT)", 2014, https://library.e.abb.com/public/fc192d38056fa3b3c12579f20055483b/11-17%201m211_EN_72dpi.pdf, ABB Power Products, Transformers, 7 pages.

* cited by examiner

US 9,571,000 B2

METHOD FOR CONTROLLING OF A MODULAR CONVERTER

FIELD OF THE INVENTION

The invention relates to a method for controlling a modular converter in accordance with the preamble of the independent patent claim.

BACKGROUND OF THE INVENTION

For an electric power supply of electric trains or trams, modular converters comprising a plurality of converter cells configured to produce from an AC input voltage a DC output voltage which may be supplied to electrical installations on-board have recently received growing attention. Usually, the AC input voltage is supplied from a line, in particular an overhead line.

In an exemplary modular converter, each converter cell comprises a resonant DC-to-DC converter, which is connected to the line via an AC-to-DC converter. In the resonant DC-to-DC converter, a DC-to-AC converter on a line side is connected via a resonant transformer with a further AC-to-DC converter on a motor side. Both the DC-to-AC converter and the further AC-to-DC converter may be active converters comprising controllable semiconductor switches.

Frequently, a control method for the modular converter is based on hard-switching of the AC-to-DC converters' semiconductor switches and soft-switching of the DC-to-DC converters' semiconductor switches, with low current switching during a turn-off, possibly in combination with zero voltage switching (ZVS) during a turn-on of the DC-to-DC converter semiconductors.

As switching losses depend on voltage and current during switching, said switching method may result in low switching losses and thus in a high-efficiency AC-to-DC conversion at nominal power ratings.

However, when this switching method is used under light-load or no-load conditions, the switching losses of the AC-to-DC converter cells stay approximately the same, but less power is transferred, and thus efficiency decreases. In an extreme case, when no power is required to be transferred by the converter cells, switching losses in almost equal amounts would nevertheless occur.

WO 2014/037406 A1, which is hereby included by reference in its entirety, is concerned with enhancing the efficiency of a modular converter under low load or very low load conditions. Amongst other measures, this is achieved by operating the AC-to-DC converters in an intermittent mode. In said intermittent mode, in dependence on voltage and power capabilities, a first number of converter cells may be short circuited. For a second number of remaining converter cells, all AC-to-DC converters are put into an active mode when a DC-link voltage for one of the converter cells falls below an individual threshold; and are deactivated (or turned off) when a sum of all DC-link voltages of the remaining converter cells reaches a further threshold.

However, if a difference between individual thresholds and further threshold is selected sufficiently large, the DC-link voltages will oscillate between the individual threshold for the respective cell and the further threshold, which may lead to voltage oscillations and thus converter instabilities. On the other hand, if the difference between individual thresholds and further threshold is chosen relatively small, converter efficiency under low load and in particular under very low load operation remains unsatisfactory, due to the fact that the AC-to-DC converters remain in active mode.

It is an object of the invention to provide a method for controlling of a modular converter which overcomes the disadvantages as discussed above.

This object is achieved by a method in accordance with the invention.

SUMMARY OF THE INVENTION

This object is achieved by the subject-matter of the invention. Further exemplary embodiments are evident from the invention and the following description.

A method in accordance with the invention for controlling a modular converter,
said modular converter in particular comprising a plurality of M converter cells, each converter cell comprising
a. an AC-to-DC converter, a primary side of which represents a primary side of said converter cell, said AC-to-DC converter being an active AC-to-DC converter comprising a plurality of semiconductor switches (46a-d), and operable in one of a plurality of modes, the plurality of modes comprising a bypassed mode, an active mode, and a diode mode;
b. a DC-to-DC converter, a secondary side of which represents a secondary side of said converter cell; with
c. a secondary side of said AC-to-DC converter and a primary side of said DC-to-DC converter connected in parallel with a DC-link capacitor, wherein
the primary sides of the converter cells are connected in series, with a first converter cell connected to a line, preferably a medium voltage line, providing an AC line voltage $U(t)$ having a peak value $\hat{U}$, and an M-th converter cell connected to a ground;
comprises the steps of:
for a given allowable range $[U_{min}, U_{max}]$ of a DC-voltage $U_{DC}$ at the DC-link capacitor
a. determining whether any integer number $N \leq M$ exists for which
b. $\hat{U}/N < U_{min}$, and
c. $\hat{U}/(N-1) > U_{max}$; and
if such integer number N exists:
a. selecting an integer number L with $L < N$,
b. selecting a first set of N−L converter cells,
c. selecting a second set of L converter cells,
d. putting the AC-to-DC converter of, preferably all, converter cells which have not been selected in steps ii) or iii) into bypassed mode,
e. putting the AC-to-DC converter of, preferably all, converter cells from the first set into diode mode,
f. putting the AC-to-DC converter of, preferably all, converter cells from the second set into active mode.

Summarized, the method provides an energy-efficient switching strategy for low and very low power ratings, not only at a nominal operating point. In particular, in traction applications power ratings change constantly during a load cycle, thus an availability of high efficiency over a whole range of power ratings is beneficial.

Furthermore, the method provides a stable operation of the modular converter and may achieve the control objectives (sinusoidal input current and control of DC output voltage) under steady-state conditions for low and very low load conditions.

A further aspect of the invention relates to a controller of a modular converter, wherein the controller is adapted for performing the method as described in the above and in the following. The controller may comprise a control unit providing switching signals to said AC-to-DC converter and said DC-to-DC converter, implementing one or more variants of the low load control method as described in the above and in the following.

A further aspect of the invention relates to a modular converter for supplying a DC output voltage to at least one electrical motor, in general via a separate motor converter, in particular a motor inverter. For example, the electrical motor may be the motor of a train or a tram. It has to be understood that features of the method as described in the above and in the following may be features of the modular converter and the controller as described in the above and in the following, and vice versa.

The modular converter may comprise a controller as described in the above and in the following. The controller or control unit may generate and provide switching signals to the AC-to-DC converter and to the DC-to-DC converter, in particular for pulsing of semiconductor switches comprised by said converters.

The AC-to-DC converter may be a full-bridge converter, which is adapted for converting a first side AC voltage into a first side DC voltage, or vice versa.

According to an embodiment of the invention, each DC-to-DC converter comprises a DC-to-AC sub-converter and an AC-to-DC sub-converter which are coupled via a transformer.

The DC-to-DC converter may be a resonant converter, which is adapted for converting the first DC voltage to a second DC voltage, or vice versa.

These and other aspects of the invention will become apparent from and elucidated with reference to the embodiments described hereinafter.

BRIEF DESCRIPTION OF THE DRAWINGS

The subject matter of the invention will be explained in more detail in the following text with reference to exemplary embodiments which are illustrated in the attached drawings.

In principle, identical parts are provided with the same reference symbols in the figures.

DETAILED DESCRIPTION OF THE INVENTION

Figure 1:
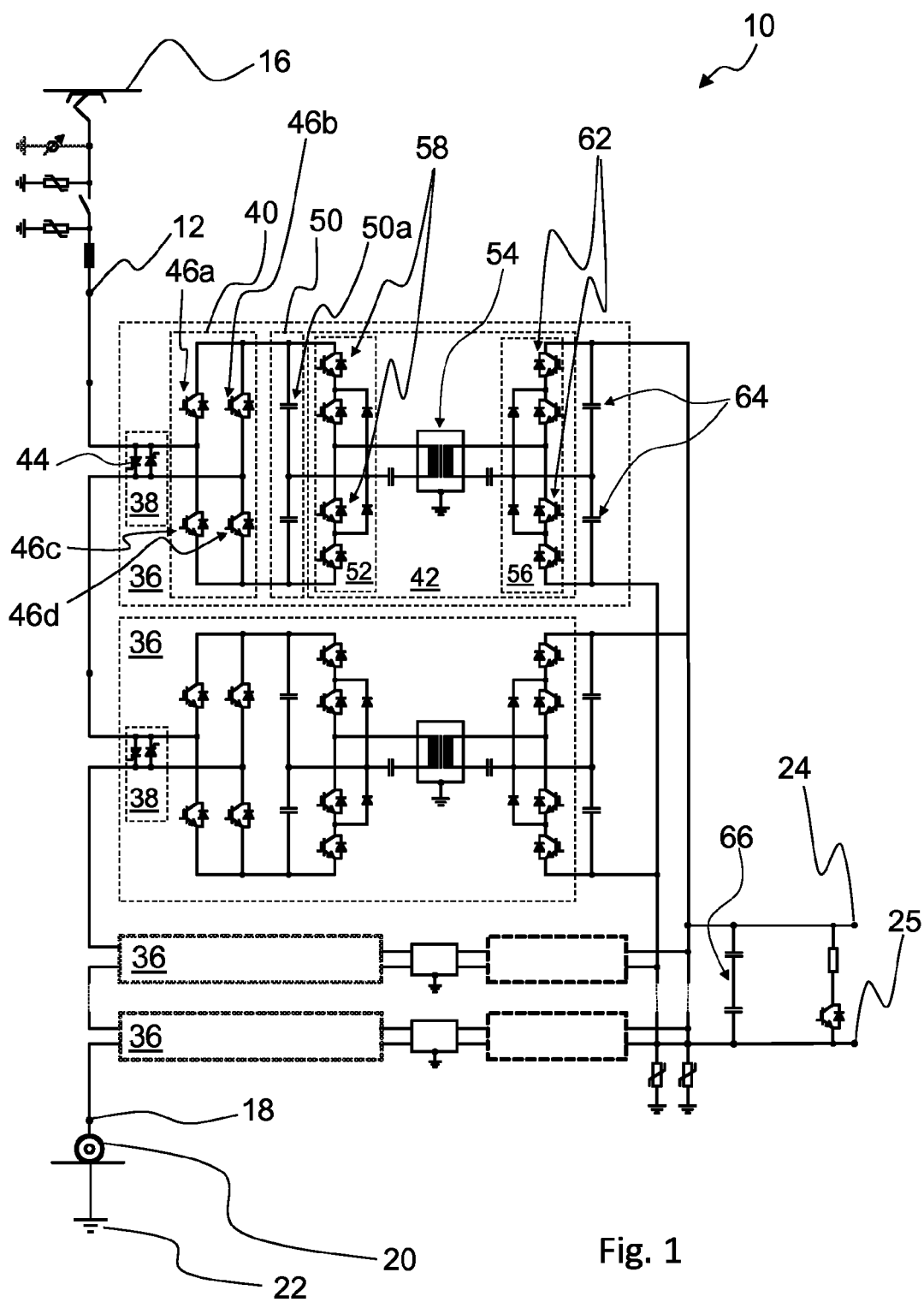
FIG. 1 schematically shows a modular converter for use with a method according to an embodiment of the invention.

FIG. 1 shows an exemplary modular converter 10 for an electric train or tram, which may also be referred to as power electronic transformer (PET) or power electronic traction transformer (PETT). In general, the modular converter may be adapted for transforming a medium AC voltage to a low or medium DC voltage. The converter has an input 12 which is connectable to a catenary or overhead line 16 for supplying the converter 10 with a line voltage U(t), said line voltage U(t) having an AC frequency $f_{line}$, a peak value $\hat{U}$ and/or a root-mean-square value $U_g$ with, in general, $U_g=\hat{U}/\sqrt{2}$, in particular a medium-voltage AC input voltage, through a pantograph 14 and an inductor. Exemplary nominal values for the AC frequency $f_{line}$ may be between 10 and 100 Hz, in particular 16⅔ Hz, 25 Hz, 50 Hz or 60 Hz. The converter 10 comprises an earthing point 18 for connecting the converter 10 to an earth 22, e.g. through wheels 20 of the train or tram.

The converter 10 has a DC output comprising a positive DC output 24 and a negative DC output 25 for supplying a load of the train or tram with a DC output voltage of e.g. about 1 kV. The load may comprise an electric motor, generally connected to the DC output via a motor converter; electrical on-board installations; further converters and/or an auxiliary power supply.

The converter 10 has a modular structure and comprises a plurality of M converter cells 36, with each converter cell 36 being represented by a unique integer cell index i with $i \in \{1; \ldots; M\}$. The converter cells 36 each comprise two input terminals and two output terminals; and thus are four-terminal converter cells connected in series on a primary side 32, i.e. connected in series between the input 12 and the earthing point 18 and in parallel on a secondary side 34, i.e. connected in parallel to the two outputs 24, 25.

Only the first and the second converter cell 36 are shown in detail.

Each converter cell 36 comprises a short-circuit switch 38, an AC-to-DC converter 40 and a DC-to-DC converter 42.

The short-circuit switch 38 of each converter cell 36 is connected in series to the short-circuit switches 38 of the other converter cells 36 and comprises two power semiconductor switches 44, in particular thyristors, connected in parallel in opposite directions. In general, the short-circuit switch 38 may comprise alternative kinds of switches, for example one or more electromechanical switches. By means of the short-circuit switch 38, the two input terminals of the converter cell 36 may be short circuited, thus putting the AC-to-DC converter 40 of the converter cell 36, and thus the whole converter cell 36, into a bypassed mode.

The AC-to-DC converter 40 is an active front end (AFE) with four power semiconductor switches 46a, 46b, 46c, 46d connected into an H-bridge. For each of the four power semiconductor switches 46a-d, a diode is connected in parallel in an opposite direction. The AC-to-DC converter 40 and the DC-to-DC converter 42 are connected via a primary side DC link, which comprises a primary side DC link capacitor 50, which in turn comprises a first sub-capacitor 50a and a second sub-capacitor 50b connected in series. For reasons of brevity, primary side DC link and primary side DC link capacitor 50 are simply referred to as DC link and DC link capacitor above and in what follows. An output of the DC-to-DC converter 42 of each converter cell 36 is connected in parallel with the outputs of the DC-to-DC converters 42 of the other converter cells 36. Input terminals of the AC-to-DC converter 40 are represented by, connectable to, or fixedly connected with input terminals of the converter cell 36. A primary side of the AC-to-DC converter 40 thus represents a primary side of the converter cell 36.

The DC-to-DC converter 42 is a resonant converter and comprises a first side resonant sub-converter 52, and a second side resonant sub-converter 56, which are coupled via a resonant tank or transformer 54.

The first side resonant converter 52 is connected to the DC link capacitor 50 and comprises an upper and a lower pair of power semiconductor switches 58 connected in series. A first input of the primary side of the transformer 54 is connected between the two pairs of power semiconductor switches 58. A second input of the primary side of the transformer 54 is connected via a capacitor 60 to a point between the first sub-capacitor 50a and the second first sub-capacitor 50b of the DC-link capacitor 50.

Likewise, the second side resonant converter 56 comprises an upper and a lower pair of power semiconductor switches 62 connected in series, which are connected in parallel with a secondary side DC link with third sub-capacitor 64a and a fourth sub-capacitor 64b connected in series to form a secondary side DC-link capacitor 64. One input of the secondary side of the transformer 54 is connected between the two pairs of power semiconductor switches 62. The other input of the secondary side of the transformer 54 is connected between the capacitors.

Exemplary, all the power semiconductor switches 44, 46a-d, 58, 62 are IGBTs.

Each converter cell 36 may comprise a local controller (not shown in FIG. 1), which is adapted to control the semiconductor switches 44, 46a-d, 58, 62 of the respective converter cell 36. The local controllers may be communicatively interconnected with a main controller, which is adapted to control the local controllers. However, it is also possible that the main controller controls the semiconductor switches 44, 46a-d, 58, 62 directly. In particular, each of the semiconductor switches may independently be switched between a conducting and a blocking state, in particular a forward blocking state, by means of switching pulses applied by the controller.

When the modular converter is in operation under nominal conditions, the AC-to-DC converters 40 are in an active mode, i.e. the four power semiconductor switches 46a-d of each of the AC-to-DC converters 40 are repeatedly switched by the controllers in a switching pattern appropriate to ensure a sufficient flow of electric power from the line into the DC-link capacitor 50. In particular, each of the four power semiconductor switches 46a-d is repeatedly switched between conducting and blocking state in an individual switching pattern. In general, switching is done at time scales substantially smaller than a period of the AC grid voltage. Both AC-to-DC converters 40 as well as power semiconductor switches 46a, 46b, 46c, 46d are also referred to as "being pulsed", or briefly said to "be pulsed" when the AC-to-DC converters 40 are in active mode. Exemplary, the modular converter may be operated in a pulse width modulation (PWM) mode, so that for a sum over voltages $U_{DC,i}$ at each of the DC-link capacitors 50 with $i \in \{1; \ldots ; M\}$, $\sum_{i=1}^{M} U_{DC,i} \leq \hat{U}$ holds. For the voltages $U_{DC,i}$ at the DC-link capacitors 50, an allowed band of values $[U_{DC,min}, U_{DC,max}]$ and a desired value $U_{DC,opt} \in [U_{DC,min}, U_{DC,max}]$ is defined. In general, pulsing is done with an average duration $\tau_{pulsing}$ between successive, identical switching operations, in particular periodically with a frequency $f_{PWM}$, in particular a pulse width modulation frequency, resulting in $\tau_{pulsing}=1/f_{PWM}$. Typically, $f_{PWM} \gg f_{line}$, with typical values being 1000 Hz$<f_{line}<$2000 Hz. Under successive, identical switching operations, two successive switching operations in the same direction are to be understood, i.e. either two successive operations switching from blocking state to conducting state, or two successive operations switching from conducting state to blocking state.

Under a low load condition, in particular when a power P consumed at the DC output is significantly smaller than a nominal or rated power $P_{nominal}$ of the modular converter, in particular when 10 P$<P_{nominal}$, it may be considered to operate the AC-to-DC converters 40 in a diode mode, in which the four power semiconductor switches 46a-d are not pulsed. In particular, an AC-to-DC converter 40 may be regarded as being in diode mode during time intervals $\tau_{diode}$ when its four power semiconductor switches 46a-d are in a blocking state, where $\tau_{diode} > 2\tau_{pulsing}$, preferably $\tau_{diode} \gg \tau_{pulsing}$ and/or $\tau_{diode} \approx 1/(2 f_{line})$ or $\tau_{diode} > 1/(2 f_{line})$ holds. However, depending on a load attached to the DC output, this would lead to a decrease of the voltages $U_{DC,i}$ at the DC-link capacitors 50, and subsequently a decrease in voltages $U_{DC,out,i}$ at the secondary side DC-link capacitors 64, and thus a voltage $U_{DC,out}$ at an output DC link 66 and at the DC output.

Under such circumstances, loads connected to DC output may no longer operate normally.

To increase the voltages $U_{DC,i}$ at the DC-link capacitors 50 while allowing for AC-to-DC converters 40 of converter cells 36 to be operated in diode mode, one or more elected converter cells 36 may be bypassed, e.g. by means of the short-circuit switch 38 of the respective converter cell or cells 36, or by switching a zero vector with the AC-to-DC converter 40 of the respective converter cell or cells 36, leaving a first subset $S_1 \subset \{1; \ldots ; M\}$ of $|S_1|$ converter cells in diode mode. As a consequence, the line voltage will effectively be divided by a smaller number of converter cells 36, resulting in a higher voltage $U_{DC,j}$ at the remaining converter cells with $j \in S_1 \subset \{1; \ldots ; M\}$.

Figure 2:
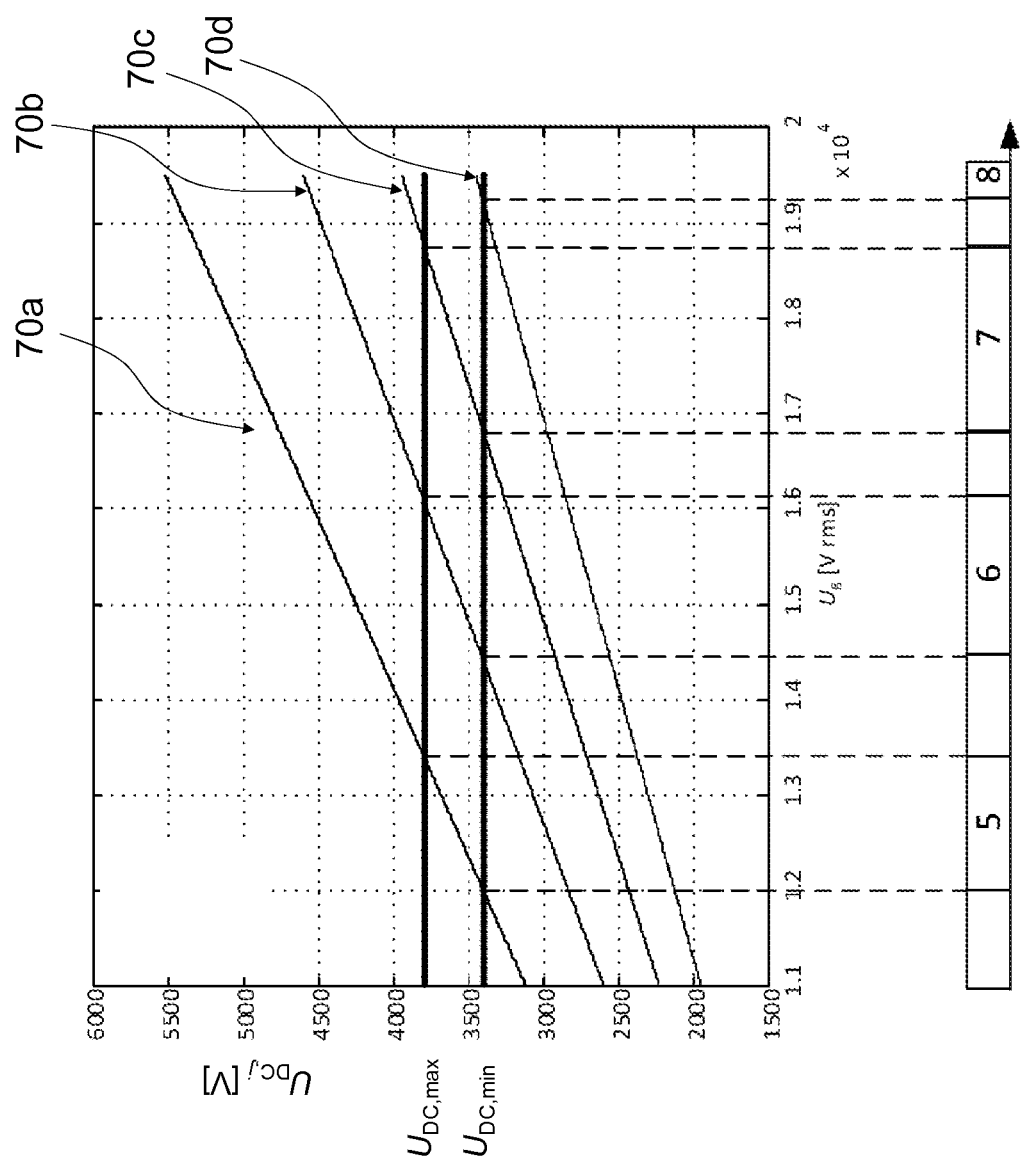
FIG. 2 illustrates a dependence of DC-link voltages on line voltage and a number of active front-ends operated in a diode mode.

However, for certain given bands of values $[U_{DC,min}, U_{DC,max}]$ this approach only works for line voltages $U(t)$ having peak value $\hat{U}$ and/or root-mean-square values $U_g$ within certain ranges. This is illustrated in FIG. 2, which shows the voltages $U_{DC,i}$ at the DC-link capacitors 50 for different numbers $|S_1| \in \{5; 6; 7; 8\}$ of converter cells 36 in diode mode, where it was assumed that the DC-link capacitors of all converter cells are equal, and thus $U_{DC,k} = U_{DC,l} = U_{DC}$ for all $k,l \in S_1$; and that a negligible amount of power P, preferably with 100 P$<P_{nominal}$ is drawn by the load at the DC output. Curve 70a shows the voltage $U_{DC,i}$ at the DC-link capacitors 50 for $|S_1|=5$, curve 70b for $|S_1|=6$, curve 70c for $|S_1|=7$, and curve 70d for $|S_1|=8$. The horizontal lines at $U_{DC,min}$=3400V and $U_{DC,max}$=3800V illustrate an exemplary given bands of values $[U_{DC,min}, U_{DC,max}]$. As may be seen, for exemplary root-mean-square values $U_g$/kV$\in$[13.4; 14.4], $U_g$/kV$\in$[16.8; 18.8] of the line voltage, no number of converter cells in diode mode may be found for which $U_{DC}$ will be within the given band of values [3.4 kV, 3.8 kV]. In other words, for a given band of values $[U_{DC,min}, U_{DC,max}]$, and certain peak values $\hat{U}$ of the line voltage, a number N$\leq$M exists for which $\hat{U}/N<U_{min}$, but $\hat{U}/(N-1)>U_{max}$.

In a preferred variant of the method in accordance with the invention, in a situation as described above, the AC-to-DC converter 40 of one selected converter cell 36, represented by integer cell index s with s$\in\{1; \ldots ; M\}$, is put into active mode, whereas the AC-to-DC converters 40 of N−1 other converter cells 36 are operated in diode mode. Said N−1 other converter cells 36 thus again represent a first subset $S_1 \subset \{1; \ldots ; M\}$, in particular $S_1 \subset \{1; \ldots ; M\}\setminus\{s\}$, of converter cells 36 with $|S_1|=N-1$; whereas the selected converter cell 36 represents a second subset $\{s\}= S_2 \subset \{1; \ldots ; M\}$ of converter cells 36 with $|S_2|=1$ and $S_1 \cap S_2 = \emptyset$. The remaining converter cells 36, i.e. a third subset $S_3 = (\{1; \ldots ; M\}\setminus S_1)\setminus S_2$ of converter cells 36, are bypassed, e.g. by putting their respective AC-to-DC converters 40 into bypassed mode. The selected converter cell 36 acts as a boost cell. Due to the pulsing of the selected converter cell 36, higher values of a current I(t) flowing into the modular converter 10 can be achieved, which in turn will lead to an increase in DC-link voltages.

Preferably, in order to keep the DC-link voltages $U_{DC,i}$ of the selected converter cell 36 and the N−1 other converter cells 36 optimally balanced, i.e. to match $U_{DC,k}=U_{DC,l}=U_{DC,opt}$ as closely as possible for all $k,l \in S_1 \cup S_2$, pulsing is done cyclically with all cells from $S_1 \cup S_2$, i.e. all converter cells 36 in operation. In other words, the selected converter cell 36 is repeatedly, preferably periodically, exchanged against one of the N−1 other converter cells 36; preferably against one of the N−1 other converter cells 36 that has been in diode mode for a longest time out of all the N−1 other converter cells 36.

Pulsing of the selected converter cell has no effect as long as sum of the DC-link voltages of the N−1 other converter cells 36 is larger than a momentary value of the line voltage, i.e. as long as $$\sum_{i \in S_1} U_{DC,i} \geq |U(t)|.$$

In a preferred variant of the method in accordance with the invention, pulsing of the selected converter cell 36 is started when, and preferably maintained as long as $$\sum_{i \in S_1} U_{DC,i} < |U(t)|;$$

and/or stopped when, and preferably suppressed as long as $$\sum_{i \in S_1} U_{DC,i} \geq |U(t)|.$$

Preferably, during periods when the selected converter cell 36 is not pulsed, said cell is put into diode mode. Preferably, during periods when the selected converter cell 36 is being pulsed, the DC-link voltage $U_{DC,s}$ of the selected converter cell 36 is controlled by means of closed loop control based on a set value $U_{DC,set} \in [U_{DC,min}, U_{DC,max}]$, wherein the selected converter cell 36 is preferably operated in PWM mode, preferably with $U_{DC,set} = U_{DC,opt}$.

Figure 3:
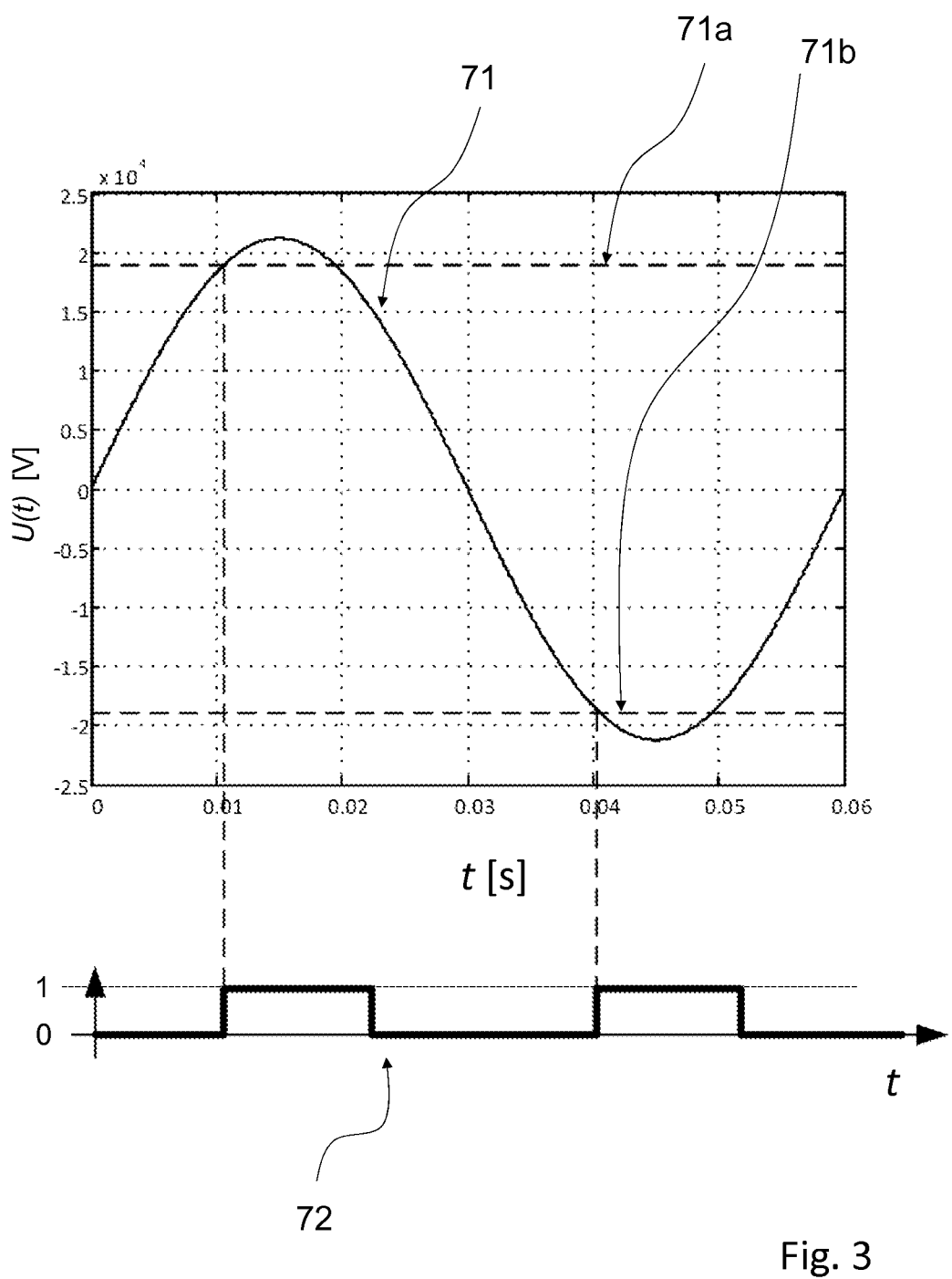
FIG. 3 illustrates various aspects of controlling a selected converter cell in a method in accordance with the present invention.

FIG. 3 illustrates the various aspects of controlling the selected converter cell 36 as described above. Curve 71 shows the line voltages U(t) over one period. Horizontal lines 71a and 71b indicate $$\sum_{i \in S_1} U_{DC,i} \text{ and } -\sum_{i \in S_1} U_{DC,i},$$

respectively. Curve 72 illustrates an enable signal, which may be used to enable and disable pulsing of the power semiconductor switches 46a-d in order to put the selected converter cell 36 into active mode and diode mode, respectively.

With the above described methods, lower switching losses at light-load or no-load condition may be achieved and thus a high efficiency may be maintained over the whole power range, and/or over the whole load cycle.

By applying this light-load strategy, it is possible to keep the efficiency of the resonant converter 10 high under light-load and no-load conditions. The methods may be simple to implement as an addition to an existing control method. The methods may provide a continuous adaptation of the switching strategy for different power levels while the overall control objectives are maintained. There is no additional hardware needed. All methods can work independently or in any combination, which enables the possibility to adapt the switching strategy based on the requirements for different applications.

Unless stated otherwise, it is assumed that throughout this patent application, a statement a≈b implies that $|a-b|/(|a|-|b|)<10^{-1}$, preferably $|a-b|/(|a|+|b|)<10^{-2}$, wherein a and b may represent any mathematical, electric and/or physical quantities or other arbitrary variables as described and/or defined anywhere in this patent application, or as otherwise known to a person skilled in the art. Further, a statement that a is at least approximately equal or at least approximately identical to b implies that a≈b, preferably a=b. Further, unless stated otherwise, it is assumed that throughout this patent application, a statement a>>b implies that a>10b, preferably a>100b; and statement a<<b implies that 10a<b, preferably 100a<b.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:
1. A method for controlling a modular converter,
a) the modular converter comprising a plurality of M converter cells, each converter cell comprising
  i) an AC-to-DC converter, a primary side of which represents a primary side of said converter cell, said AC-to-DC converter being an active AC-to-DC converter comprising a plurality of semiconductor switches, and operable in one of a plurality of modes, the plurality of modes comprising a bypassed mode, an active mode, and a diode mode;
  ii) a DC-to-DC converter, a secondary side of which represents a secondary side of said converter cell; with
  iii) a secondary side of said AC-to-DC converter and a primary side of said DC-to-DC converter connected in parallel with a DC-link capacitor, wherein
b) the primary sides of the converter cells are connected in series, with a first converter cell connected to a line, preferably a medium voltage line, providing an AC line voltage U(t) having a peak value Û, and an M-th converter cell connected to a ground;
the method comprising the steps of:
c) for a given allowable range $[U_{min}, U_{max}]$ of a DC-voltage $U_{DC}$ at the DC-link capacitor
  i) determining whether any integer number N≤M exists for which
  ii) $Û/N < U_{min}$, and
  iii) $Û/(N-1) > U_{max}$; and
d) if the condition under c) is fulfilled
  i) selecting an integer number L with L<N,
  ii) selecting a first set of N−L converter cells,
  iii) selecting a second set of L converter cells, iv) putting the AC-to-DC converter of, preferably all, converter cells which have not been selected in steps ii) or iii) into bypassed mode, v) putting the AC-to-DC converter of, preferably all, converter cells from the first set into diode mode, vi) putting the AC-to-DC converter of, preferably all, converter cells from the second set into active mode.

2. The method according to claim 1, further characterized in that the secondary sides of the converter cells are connected in parallel.

3. The method according to claim 1, further characterized in that the converter cells selected in step d)ii) of claim 1 form a first subset $S_1$ of the plurality of M converter cells; the converter cells selected in step d)iii) of claim 1 form a second subset $S_2$ of the plurality of M converter cells; wherein $S_1 \cap S_2 = \emptyset$.

4. The method according to claim 1, further comprising the steps of selecting L=1 in step d)i) of claim 1.

5. The method according to claim 1, further comprising the steps of:
a) as long as the condition under c) of claim 1 is fulfilled,
b) repeatedly:
  i) selecting a first converter cell from the first set of converter cells,
  ii) selecting a second converter cell from the second set of converter cells, and
  iii) assigning the first converter cell to the second set of converter cells, and
  iv) assigning the second converter cell to the first set of converter cells.

6. The method of claim 5, wherein for a frequency $f_{line}$ of the line voltage, a maximum time span T between successive executions of steps b)i) to b)iv) of claim 5 is smaller than or at least approximately equal to $1/(2\,f_{line})$.

7. The method according to claim 1, further comprising the steps of:
a) for each converter cell in the first set of converter cells,
b) determining a DC-link voltage $U_{DC,i}$ at the DC-link capacitance of said converter cell,
c) determining a sum $U_{DC,\Sigma}$ of DC-link voltages $U_{DC,j}$ as $U_{DC,\Sigma} = \sum_{j=1}^{N-L} U_{DC,j}$,
d) putting converter cells, preferably all converter cells, from the second set into active mode when $|U(t)| > U_{DC,\Sigma}$.

8. The method according to claim 1, further comprising the steps of:
a) for each converter cell in the first set of converter cells,
b) determining a DC-link voltage $U_{DC,i}$ at the DC-link capacitance
c) determining a sum $U_{DC,\Sigma}$ of DC-link voltages $U_{DC,j}$ as $U_{DC,\Sigma} = \sum_{j=1}^{N-L} U_{DC,j}$,
d) putting converter cells, preferably all converter cells, from the second set into diode mode when $|U(t)| < U_{DC,\Sigma}$.

9. The method according to claim 1, further comprising the step of operating the active cells in a PWM mode, wherein semiconductor switches of said converter cell are switched with a PWM frequency $f_{PWM}$, preferably with $f_{line} \ll f_{PWM}$.

10. The method according to claim 9, further comprising the step of controlling PWM pulses for switching the semiconductor switches of active cells by means of closed loop control based on a set value $U_{DC\_set}$ for the DC-link voltages of the active cells with $U_{DC,set} \in [U_{min}, U_{max}]$.

11. The method according to claim 1, further characterized by bypassing converter cells which have not been selected in step ii) or iii) of claim 1 by short circuiting a primary side of said converter cells.

12. The method according to claim 1, further characterized in that when an AC-to-DC converter of a converter cell is in active mode, its semiconductor switches are repeatedly switched with an average duration $\tau_{pulsing}$ between successive, identical switching operations, preferably with $\tau_{pulsing} \ll 1/f_{line}$, where $f_{line}$ is an AC frequency of the AC line voltage U(t).

13. The method according to claim 12, further characterized in that in order to put an AC-to-DC converter of a converter cell into diode mode its semiconductor switches are set to blocking state, preferably for a time interval $\tau_{diode}$ where $\tau_{diode} > 2\tau_{pulsing}$, preferably $\tau_{diode} \gg \tau_{pulsing}$.

14. A controller for controlling a modular converter,
a) the modular converter comprising a plurality of M converter cells, each converter cell comprising
  i) an AC-to-DC converter, a primary side of which represents a primary side of said converter cell, said AC-to-DC converter being an active AC-to-DC converter comprising a plurality of semiconductor switches, and operable in one of a plurality of modes, the plurality of modes comprising a bypassed mode, an active mode, and a diode mode,
  ii) a DC-to-DC converter, a secondary side of which represents a secondary side of said converter cell, with
  iii) a secondary side of said AC-to-DC converter and a primary side of said DC-to-DC converter connected in parallel with a DC-link capacitance; wherein
b) the primary sides of the converter cells are connected in series, with a first converter cell connected to a line, preferably a medium voltage line, providing an AC line voltage U(t) having a peak value Û, and an M-th converter cell connected to a ground;
the controller configured to perform the method comprising the steps of:
c) for a given allowable range $[U_{min}, U_{max}]$ of a DC-voltage $U_{DC}$ at the DC-line capacitor
  i) determining whether any integer number $N \leq M$ exists for which
  ii) $\hat{U}/N < U_{min}$, and
  iii) $\hat{U}/(N-1) > U_{max}$; and
d) if the condition under c) is fulfilled
  i) selecting an integer number L with L<N,
  ii) selecting a first set of N−L converter cells,
  iii) selecting a second set of L converter cells,
  iv) putting the AC-to-DC converter of, preferably all, converter cells which have not been selected in steps ii) or iii) into bypassed mode,
  v) putting the AC-to-DC converter of, preferably all, converter cells from the first set into diode mode,
  vi) putting the AC-to-DC converter of, preferably all, converter cells from the second set into active mode.

15. The controller according to claim 14, further characterized in that the controller is configured to repeatedly switch the semiconductor switches of an AC-to-DC converter of a converter cell in order to put said AC-to-DC converter into active mode, with an average duration $\tau_{pulsing}$ between successive, identical switching operations, preferably with $\tau_{pulsing} \ll 1/f_{line}$, where $f_{line}$ is an AC frequency of the AC line voltage U(t).

16. The controller according to claim 15, further characterized in that the controller is configured to set the semiconductor switches of an AC-to-DC converter of a converter cell to a blocking state, preferably for a time interval $\tau_{diode}$ where $\tau_{diode} > 2\tau_{pulsing}$, preferably $\tau_{diode} \gg \tau_{pulsing}$, in order to put said AC-to-DC converter into diode mode.

\* \* \* \* \*